US006877832B2

(12) United States Patent
Smith et al.

(10) Patent No.: US 6,877,832 B2
(45) Date of Patent: Apr. 12, 2005

(54) INSTRUCTION ARCHITECTURE USING TWO INSTRUCTION STACKS

(75) Inventors: Glenn M. Smith, Vancouver, WA (US); Walter D. Clark, Vancouver, WA (US); William S. Eaton, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 120 days.

(21) Appl. No.: 10/385,838

(22) Filed: Mar. 11, 2003

(65) Prior Publication Data

US 2004/0179048 A1 Sep. 16, 2004

(51) Int. Cl.[7] .............................. B41J 29/38; G06F 9/30

(52) U.S. Cl. .......................................... 347/10; 712/202

(58) Field of Search .............................. 347/5, 10, 234, 347/248, 262; 712/17–19, 202, 9; 358/1.2

(56) References Cited

U.S. PATENT DOCUMENTS

| | | | | |
|---|---|---|---|---|
| 5,828,814 | A | * 10/1998 | Cyman et al. | 358/1.2 |
| 6,361,137 | B1 | 3/2002 | Eaton et al. | 347/14 |
| 6,570,604 | B2 | * 5/2003 | Able et al. | 347/262 |
| 6,782,468 | B1 | * 8/2004 | Nakazato | 712/9 |

* cited by examiner

*Primary Examiner*—Hai Pham

(57) ABSTRACT

Systems, methods, and devices are provided for instruction architecture. One embodiment includes a first integrated circuit (IC). The first IC includes at least two instruction stacks and an arbiter coupled to the at least two instruction stacks. A second IC is provided. The first and the second ICs are coupled using a serial interface.

36 Claims, 9 Drawing Sheets

INSTRUCTION ARCHITECTURE USING TWO INSTRUCTION STACKS

Printing devices, such as ink jet, laser printers, and the like, operate according to control signals, commands, and/or computer readable instruction sets to effectuate the transfer of ink onto print media. Print media comes in many forms and can include draft paper, photo paper, cardstock, letterhead, envelopes, business cards, and transparencies, among others. Operation of the printing device is administered by one or more controllers, such as a microprocessor controlled printed circuit board and one or more application specific integrated circuits (ASICs or chipsets) connected by appropriate interfaces, e.g. cabling. In an ink jet printer, the controllers regulate the movement of a carriage, holding one or more ink jet pens, across a print media. The controllers further regulate the timing and firing of the ink on to the print media. Various controllers or chipsets are designed to perform measurement functions associated with the printing process, such as ink flight time and ink drop impact. The results of such measurements enable the printing device to calibrate pen velocity, paper speed, printhead temperature, and other printing properties in communication with such hardware as carriage encoders, paper encoders and the like.

Multiple time sensitive processes exist in many environments. The inkjet printer area has numerous processes that must occur nearly simultaneously. For example, two particular processes that must occur nearly simultaneously include motor and measurement routine control. That is, servo control of a motor for paper or carriage movement and the collection of multiple measurement samples from one or more measurement sensors must be taken at nearly the same motor position. In order to perform both of these functions, communication to an analog IC takes place. In some cases, the measurement commands lock out other use of the command area (e.g. instruction routine, data registers, and interface use) until it has acquired two nearly simultaneous measurements. The interface will be idle during the actual analog to digital data conversion time. The time to do this is too long to lock out the servo routine from use of the interface that they must share, when a single analog IC is used for both functions.

Previous approaches to resolving this problem involved using two separate analog ASICs each with their own dedicated interfaces to do each time sensitive process. Though there were other advantages to using separate ICs in the past, those advantages no longer exist with certain inkjet pen architectures. The disadvantage of a multiple IC implementation is cost. That is, using two analog ASICs creates added cost in real estate and chip count as well as cost in the form of extra interface circuitry and pin count on the ASICs.

DETAILED DESCRIPTION

The present invention provides techniques for an instruction architecture using two instruction stacks. Various embodiments allow the use of a single serial bus interface for multiple time sensitive processes. Various embodiments utilize three programmable command areas, or firmware programmable instruction stacks, coupled via grant and request lines to an arbiter. In various embodiments, the instruction stacks have space for eight (8) or more instructions (commands). In various embodiments, at least two of the command areas have looping and delay capability. In various embodiments, a third command area is an instruction queue, such as a first-in-first-out instruction queue. In various embodiments, the third command area includes an instruction stack similar to the first two instruction stacks.

In various embodiments, different firmware processes or routines can be programmed to the one or more firmware programmable instruction stacks in a dedicated fashion such that the instruction stacks do not have to share a command area, e.g. routines being written, erased, rewritten, etc. In this manner, there can be less conflict for command area. In various embodiments, instructions or commands can be sent out over a single serial bus based on a priority assigned to each instruction stack. A regulation based on a priority, or time sensitivity, can ameliorate interface issues and reduce delay for various processes executable by the routines programmed to each of the one or more instruction stacks.

Various embodiments of the invention can be performed in one or more devices, device types, and system environments including networked environments.

Figure 1:
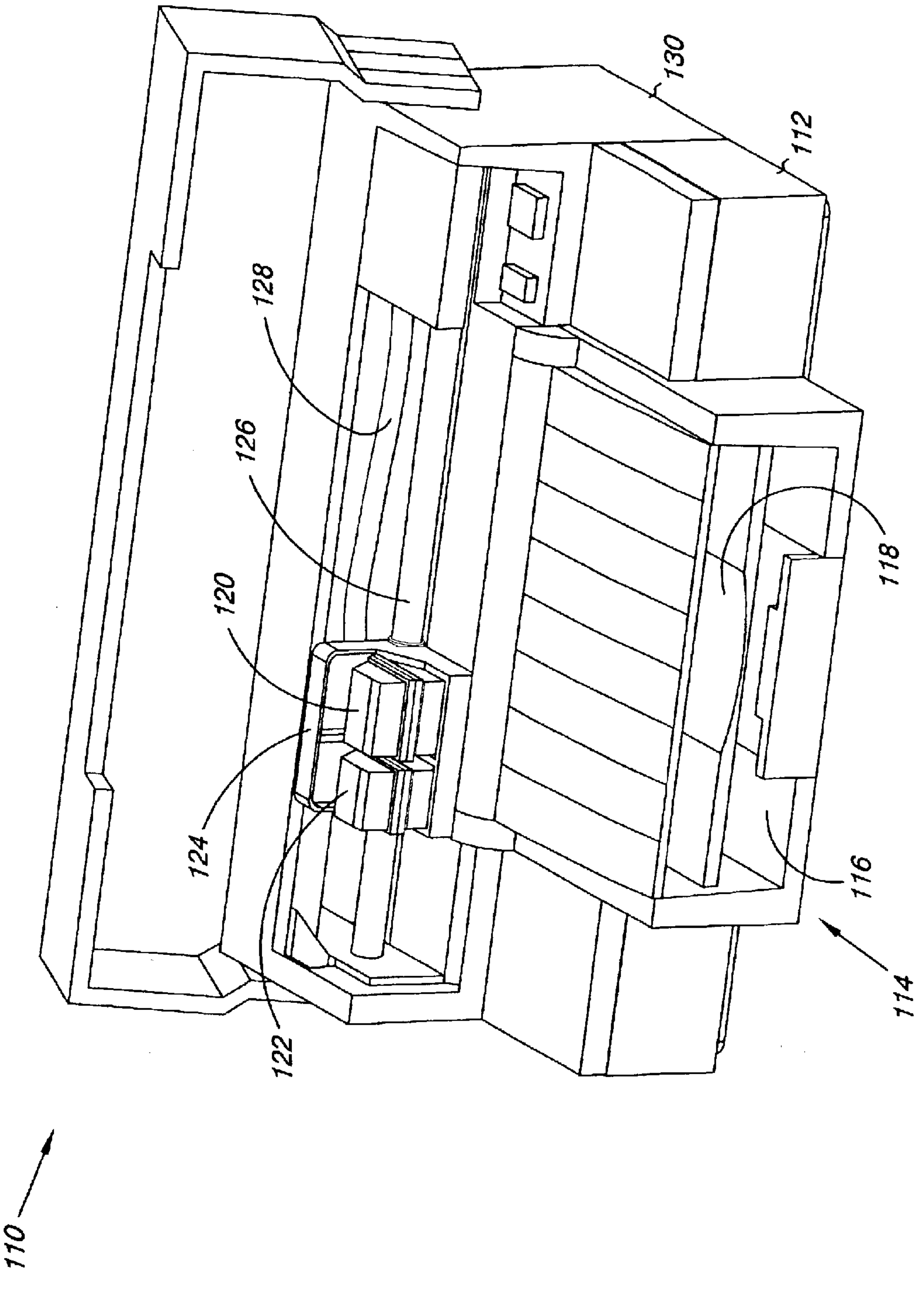
FIG. 1 illustrates an embodiment of a printing device which is operable to implement or which can include embodiments of the present invention.

FIG. 1 illustrates an embodiment of a printing device which is operable to implement or which can include embodiments of the present invention. The embodiment of FIG. 1 illustrates an inkjet printer 110, which can be used in an office or home environment for business reports, correspondence, desktop publishing, pictures and the like. However, the invention is not so limited and can include a laser jet printer or other printers implementing various embodiments of the present invention. In the embodiment of FIG. 1, the printer 110 includes a chassis 112 and a print media handling system 114 for supplying one or more print media, such as a sheet of paper, business card, envelope, or high quality photo paper to the printer 110. The print media can include any type of material suitable for receiving an image, such as paper card-stock, transparencies, and the like. In the embodiment of FIG. 1, the print media handling system 114 includes a feed tray 116, an output tray 118, and a series of rollers (not shown) for delivering sheets of print media from the feed tray 116 into position for receiving ink from one or more inkjet cartridges, shown in FIG. 1 as 120 and 122. In the embodiment of FIG. 1, inkjet cartridge 120 is a multi-color ink cartridge and inkjet cartridge 122 is a black ink cartridge.

As shown in the embodiment of FIG. 1, the ink cartridges 120 and 122 are transported by a carriage 124. The carriage 124 can be drive along a guide rod 126 by a drive belt/pulley and motor arrangement (need to show). In other printing devices the ink cartridges can be replaced by dry or liquid toner, such as in laser or liquid electro photography systems. Likewise, the actual carriage type and motor control arrangement can vary among printing devices. However, various embodiments of the invention can be included and implemented among these.

In the embodiment of FIG. 1, the cartridges 120 and 122 selectively deposit ink droplets on a sheet of paper or other print media in accordance with instructions received via a conductor strip 128 from a printer controller 130 which can be located within chassis 112. The controller 130 receives a set of print instructions from a print driver. A print driver can reside in a computing device, such as a desktop, laptop, and the like, coupled to the printing device 110 via a network. A print driver can also reside in the printing device 10 itself as in the case of a stand alone printing device, photo printer, kiosk, or standalone appliance. As discussed in more detail below, a display can be associated with the printing device 110 to display visual information to an operator.

Figure 2:
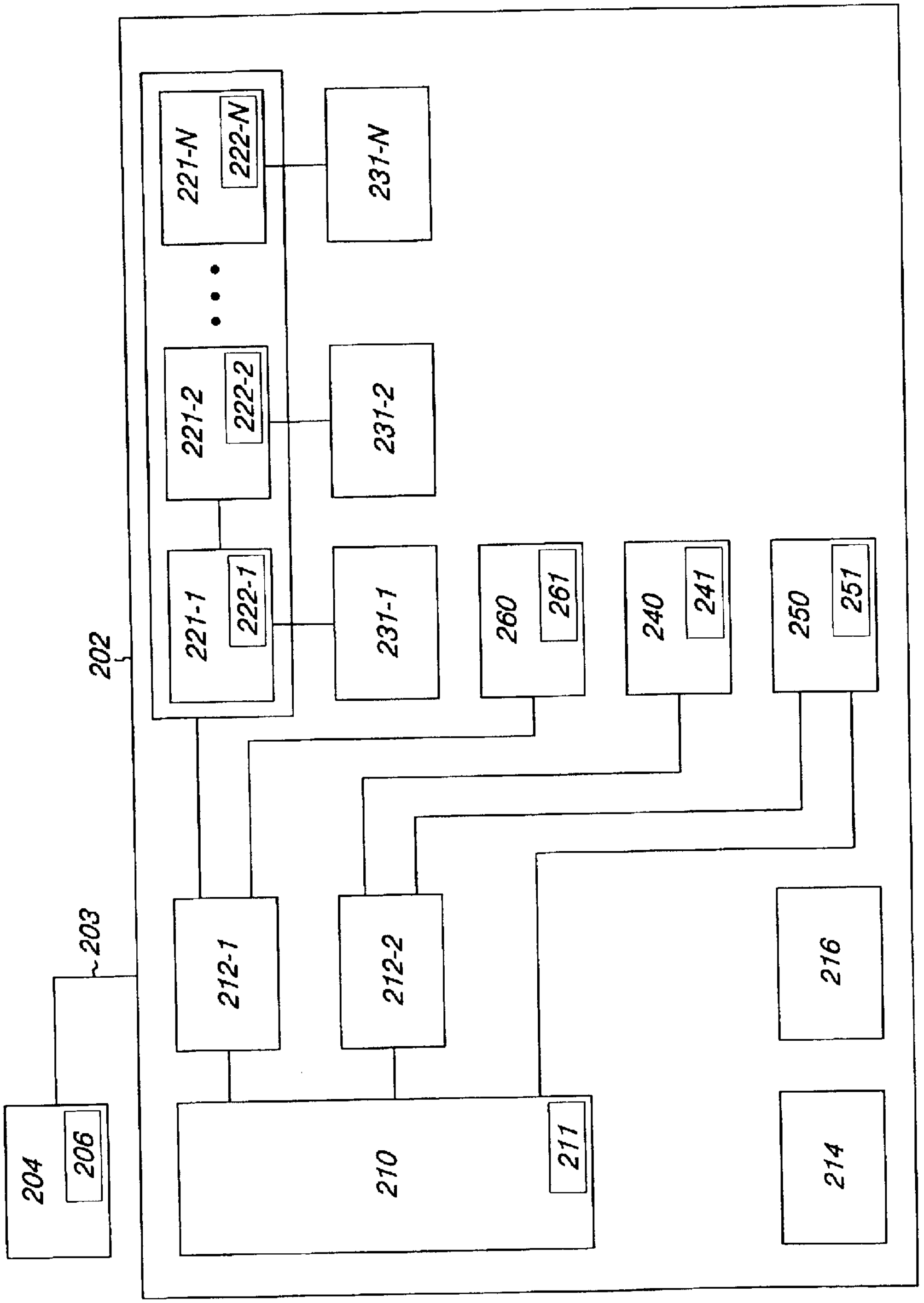
FIG. 2 is a system illustrating architectures as exist in previous printing device environments.

FIG. 2 is a system embodiment, illustrating architectures as exist in previous printing device environments. In the embodiment of FIG. 2, a printing device 202 is illustrated networked, via interface 203, to a host computer 204 (such as a laptop computer, desktop computer, workstation, and/or server, among other devices) which can include a display 206. The embodiment of FIG. 2 illustrates that the printing device 202 includes at least one application specific integrated circuit (ASIC), 210 which can include one or more processors, shown as 211. As shown in FIG. 2, the ASIC, 210, can interface with one or more analog ASICs, shown as 212-1, 212-2, to perform a variety of functions.

For example, ASIC 210 can contain routines applicable to print head firing and control. ASIC 210 can communicate to an analog ASIC 212-1 to perform measurement routines. Measurement routines from the analog ASIC 212-1 can interface with sensors, 222-1, 222-2, . . . , 222-N, associated with one or more ink reservoirs, 221-1, 221-2, . . . , 221-N, to determine fluid levels therein. ASIC 210 can also communicate to an analog/digital ASIC 212-1 to control the firing of one or more print heads 231-1, 231-2, . . . , 231-N.

ASIC 210 can contain media sensing routines applicable to detect a media type in a printing device. For example, ASIC 210 can communicate to analog ASIC 212-1 to drive circuitry 260. Circuitry 260 can be operable to perform measurement routines with sensors, 261, to detect a media type. That is, sensors 261 can conduct specular and diffuse measurements on the present media.

ASIC 210 can also contain paper servo routines applicable to paper servo control in a printing device. For example, ASIC 210 can communicate to an analog ASIC 212-2 to read a motor encoder 240. Measurement routines can interface with registers, sensors, and counters, 241, associated with the motor encoder to track and control paper movement, including speed and direction.

Additionally, ASIC 210 can contain carriage servo routines applicable to carriage servo control in a printing device. For example, ASIC 210 can communicate to an analog ASIC 212-2 to control, e.g. turn "on" and "off", a carriage encoder 250. Carriage encoder 250 circuitry can provide output from a digital sensor 251 to registers and counters associated with ASIC 210 to track and control carriage movement, including speed and direction.

The above described instructions and measurement routines can be provided to the above described ASIC, 210, from memory 214 and/or firmware 216 associated with the printing device.

In this specification, conductive paths, interfaces, and/or connections are intended to include any one or a combination of signal media such as hardwired electrical links, radio frequency links, infrared links, optical links and the like.

Memory 214 can include one or more computer readable media distributed throughout a printing device. The one or more computer readable memory can include large, fixed memory media such as DRAM and DDRAM, magnetic and optically read media, NV memory such as Flash memory, and many smaller memory media locations. Likewise, firmware 216 can include one or more computer readable media distributed throughout a printing device including various sorts of ROM, PROM, EPROM, EEPROM, and Flash memory among others.

As noted, the above described ASIC, 210 can include measurement and control instruction routines. Such measurement and control routines include, but are not limited to; motor control instructions, printhead temperature measurement instructions, printhead fire instructions, and calibration measurement instructions, among others.

In summary, printers can have multiple analog ASICs, e.g. 212-1 and 212-2, to perform a variety of functions. Some of these functions are going away for new platforms, due to the additional functionality of new printhead families. Some of the remaining functions could be implemented in a single analog IC, except for a conflict between time sensitive processes that need to use the interface between the analog IC, such as 212-1 and 212-2, and a digital IC, e.g. 210. Some analog ASICs use high speed, high bandwidth, register based serial interfaces which allow connection of multiple ICs to the same interface. A method of using such a register based serial interface is to write commands into a command area of a firmware programmable instruction stack. Delay and Loop commands are implemented as part of the instruction stack structure. Once an instruction stack is written, a GO signal is issued and the stack is executed until all commands, including loops, are done.

Previous instruction stack structures/architectures have only one stack on a given digital IC, e.g. 210, which means that that time sensitive processes lock out other processes, even though a register based serial interface bandwidth could allow other processes to use the interface. The reason this is true is because another system process would have to clear and rewrite the instruction stack to use the interface. By the time the original process gets the main processor, e.g. 211, back and rewrites the instruction stack, significant time has elapsed.

Figure 3:
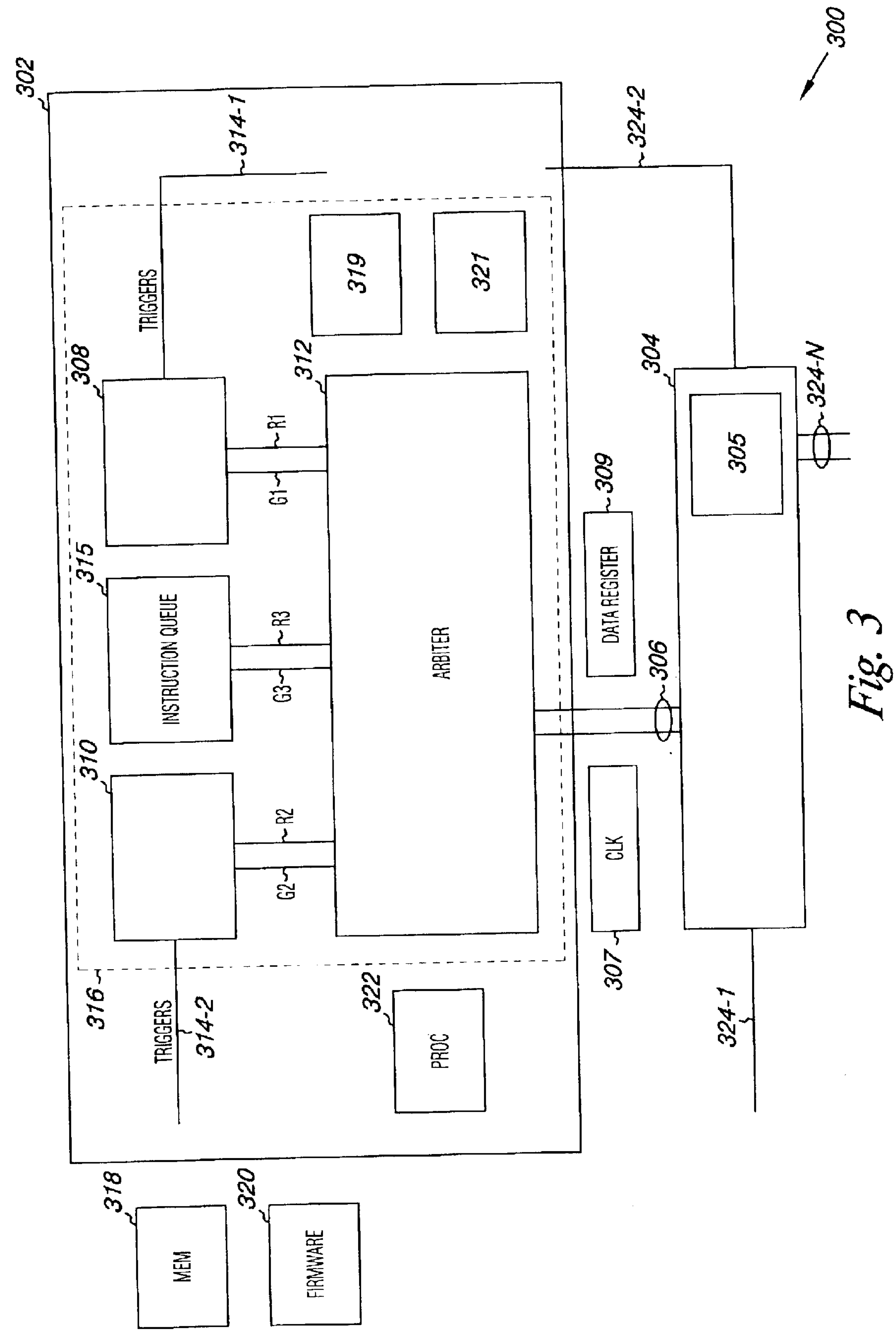
FIG. 3 illustrates an instruction architecture embodiment.

FIG. 3 illustrates an instruction architecture 300 embodiment according to the teachings of the present invention. As shown in the embodiment of FIG. 3, a first integrated circuit (first IC) 302 is interfaced with a second integrated circuit (second IC) 304 via a serial interface 306. In various embodiments, the first integrated circuit 302 can be an application specific integrated circuit (first ASIC) and the second integrated circuit 304 can be a second application specific integrated circuit (second ASIC). In various embodiments, the first integrated circuit 302 includes an all digital integrated circuit or ASIC. As shown in the embodiment of FIG. 3, the second integrated circuit 304 includes an analog/digital (A/D) converter 305. Numerous types and varieties of analog-to-digital converters (ADCs) and digital-to-analog converter (DACs) can make up the A/D converter 305 illustrated in FIG. 3 as suited to implementing the various embodiments of the present invention.

In various embodiments, the serial interface 306 includes a register based serial interface. In various embodiments, the serial interface 306 is operable to connect to multiple integrated circuits. In various embodiments, the serial interface includes a high speed serial interface operable at frequencies of twelve (12) MegaHertz or greater. In the embodiment of FIG. 3, a clock 307 is illustrated associated with the serial interface 306 for clocking the transfer of data across the serial interface 306. As shown in the embodiment of FIG. 3, one or more data registers 309 can also be associated with the serial interface 306.

In the embodiment of FIG. 3, the first integrated circuit 302 includes at least two instruction stacks, shown as 308 and 310. In the embodiment of FIG. 3 a first 308 and a second 310 instruction stack are illustrated. However, embodiments of the invention are not limited to two instruction stacks on the first integrated circuit 302. In various embodiments, the at least two instruction stacks, e.g. 308 and 310, include firmware programmable instruction stacks. That is, the at least two instruction stacks 308 and 310 include command areas which can be programmed by firmware 320, operably coupled to the first integrated circuit 302, to include a number of commands and/or routines. In various embodiments, the command areas of the at least two instruction stacks, 308 and 310, each include space to hold at least eight (8) commands.

In various embodiments, the at least two instruction stacks, 308 and 310, are configured to run off of timers or interrupt lines, illustrated in FIG. 3 as 314-1 and 314-2. Thus, at least two instruction stacks 308 and 310, are configured to be triggerable by one or more trigger sources. In various embodiments, by way of example and not by way of limitation, the one or more trigger sources include a paper timer, a paper encoder interrupt, a paper fire interrupt, and signals derived from one or more carriage encoder pulses, among others.

The embodiment of FIG. 3 further illustrates an arbiter 312 coupled to the at least two instruction stacks, 308 and 310. As shown in the embodiment of FIG. 3, the at least two instruction stacks, 308 and 310, are coupled to the arbiter 312 via a number of grant and request lines, e.g. G1, R1; G2, R2. One of ordinary skill in the art will appreciate the manner in which grant and request lines can be used to interface with arbiter 312.

In the embodiment of FIG. 3, the first integrated circuit 302 further includes an instruction queue 35. In various embodiments, the instruction queue includes a first-in-first-out (FIFO) queue. As shown in the embodiment of FIG. 3, the instruction queue can also be coupled to the arbiter 312 via grant and request lines, illustrated as G3 and R3.

In various embodiments, the arbiter 312 is operable to provide a first priority to a first one 308 of the at least two instruction stacks, 308 and 310. The arbiter is operable to provide a second priority between the instruction queue 315 and a second one 310 of the at least two instruction stacks, 308 and 310.

In various embodiments, at least one of the at least two instruction stacks, 308 and 310 includes one or more functions selected from the group of a loop function, a delay function, a read register function, a write register function, and a read register and write to memory function (such as memory 318 operably couple to the first integrated circuit 302).

In the embodiment of FIG. 3, the at least two instruction stacks, 308 and 310, the arbiter 31.2, and the instruction queue 315, with their respective grant and request lines, e.g. G1, R1; G2, R2; G3, R3, can be included as part of a first hardware set 316 on the first integrated circuit 302. The first hardware set 316 can include one or more registers 319, as well as other hardware component/functions 321. In various embodiments, by way of illustration and not by way of limitation, the other hardware component/functions can include an image pipeline and/or circuit blocks which control the firing of ink nozzles. The invention, however, is not so limited.

As shown in the embodiment of FIG. 3, the first integrated circuit includes one or more processors 322 operable on various sets of computer executable instructions as suited for implementing various embodiments of the invention. The one or more processors 322 on the first integrated circuit 302 are operably coupled to memory 318 and firmware 320 located on or off of the first integrated circuit 302. Memory 318 can include any number of various memory types such as dynamic random access memory (DRAM), double data rate synchronous DRAM (DDRAM), among others of the like. Likewise, firmware 320 can include ROM, PROM, EPROM, and EEPROM, among others of the like.

As shown in the embodiment of FIG. 3, the second integrated circuit 304, having an A/D converter 305, includes a number of connection lines, as the same have been described herein, 324-1, 324-2, . . . , 324-N, which are operable to transmit data, information, and instructions between the second integrated circuit 304 and other electronic circuitry. One of ordinary skill in the art will appreciate the various types of other electronic circuitry to which the second integrated circuit can be operably coupled. In various embodiments, by way of example and not by way of limitation, the number of connection lines can include control and sense lines and can include at least one connection line pair, e.g. 324-1, which is operable to control and/or sense a paper encoder (not shown). Likewise, as shown in the embodiment of FIG. 3, the number of control and sense lines can include at least one connection line, e.g. 324-2, which is operable to serve as an interrupt line, as the same have been described above, to at least one of the at least two instruction stacks, 308 and 310. The invention, however, is not so limited.

In various embodiments of the present invention, the instruction architecture 300 described above includes a printer instruction architecture. The invention, however, is not limited to printer instruction architectures. That is, the scope of the various embodiments is intended to include any operating environment having at least two firmware programmable instruction stacks on a first ASIC, a second ASIC coupled to the first ASIC by a serial interface, and means for arbitrating instructions between the first ASIC and the second ASIC so that multiple firmware programmable instruction stacks can access the second ASIC using the serial interface in a time sensitive manner.

In various embodiments, at least one, or a first one (e.g. 308), of the at least two instruction stacks, 308 and 310, is operable to gather data for motor servo control calculations. In various embodiments, by way of example and not by way of limitation, the first one 308 of the at least two instruction stacks, 308 and 310, is operable to gather data for motor servo control associated with a printing device. In various embodiments, by way of example and not by way of limitation, the first one 308 of the at least two instruction stacks, 308 and 310, operable to gather data for motor servo control, is dedicated a first priority to access the serial interface 306 by the arbiter 312.

In various embodiments, a second one, e.g. 310, of the at least two instruction stacks, 308 and 310, is operable to receive commands for measurement routines. In various embodiments, by way of example and not by way of limitation, the second one 310 of the at least two instruction stacks, 308 and 310, is operable to receive commands for measurement routines associated with a printing device. In various embodiments, by way of example and not by way of limitation, the second one 310 of the at least two instruction stacks, 308 and 310, operable to receive commands for measurement routines, includes measurement routines selected from the group of carriage servo measurement routines, service station servo measurement routines, paper type (e.g. media sensor) measurement routines, ink placement measurement routines (sometimes referred to herein as SPOT measurement routines), ink cartridge temperature measurement routines, and ink level fluid measurement routines (e.g. for measuring the fluid level in ink cartridge reservoirs), among others of the like. The invention, however, is not so limited. In various embodiments, the second one 310 of the at least two instruction stacks, 308 and 310, operable to receive commands for measurement routines, is provided a second priority to access the serial interface 306 by the arbiter 312.

In various embodiments, the instruction queue 315 is operable to receive command instructions. In various embodiments, the instruction queue 315 is operable to receive motor speed and direction instruction commands, associated with a printing device, from the one or more processors 322 located on the first integrated circuit 302. The invention, however, is not so limited. In various embodiments, the motor speed and direction instruction commands can include phase data and pulse width modulation (PWM) data which are intended to be written to the second integrated circuit 304, having the A/D converter 305, to make motor adjustments. In various embodiments, the instruction queue is provided a second priority to access the serial interface 306 by the arbiter 312. In various embodiments, the instruction queue shares a second priority, to access the serial interface 306, with the second one 310 of the at least two instruction stacks, 308 and 310.

In various embodiments, by way of example and not by way of limitation, the PWM and phase data can be less than 16 bits and can therefore fit into one serial interface transaction. The instruction queue 315 is large enough, e.g. deep enough, to hold serial data for as long as the serial interface is anticipated being held busy by a concurrent transaction. In various embodiments, the instruction queue 315 at least large enough to hold eight or more command instructions. The one or more processors 322 can load the command instruction data into the instruction queue 315 and then continue with other tasks. The instruction queue 315 can be configured and/or designed so that the instruction queue 315 does not fill up and create a wait.

In various embodiments, such as shown in FIG. 3, at least two firmware programmable instruction stacks, 308 and 310, and an instruction queue 315 are provided for a printing device on a first ASIC 302. In various embodiments, a register based serial interface 306 couples the first ASIC 302 to a second ASIC 304. The second ASIC 304 includes an analog/digital (A/D) converter 305. Means are provided for arbitrating instructions between the first ASIC 302 and the second ASIC 304 using the register based serial interface 306 so that multiple firmware programmable instruction stacks can access the second ASIC 304 according to time sensitive routines. As described above, a printing device includes one or more trigger sources coupled to the at least two firmware programmable instruction stacks, e.g. 308 and 310.

In various embodiments, the means for arbitrating instructions between the first ASIC 302 and the second ASIC 304 includes providing dedicated instruction routines on the at least two firmware programmable instruction stacks, e.g. 308 and 310, which are operable to read data values and manage measurement routines. In various embodiments, the means for arbitrating instructions includes an arbiter 312 which is configured to yield a first priority to a first one of the at least two firmware programmable instruction stacks, e.g. 308. The arbiter 312 is configured to share a second priority between the instruction queue 315 and one or more additional firmware programmable instruction stacks, e.g. 310. In various embodiments, the shared second priority can involve alternating access to the serial interface 306 between the instruction queue 315 and one or more additional firmware programmable instruction stacks, e.g. 310.

In various embodiments, the means for arbitrating instructions between the first ASIC 302 and the second ASIC 304 includes a set of computer executable instructions operable to request a one or more processors, e.g. 322, when read measurement data are complete in one or more of the at least two firmware programmable instruction stacks, 308 and 310. In various embodiments, the set of computer executable instructions are operable to provide instruction commands to the instruction queue 315 representing calculations by the one or more processors 322 on the read measurement data. The instruction commands can include such time sensitive instruction commands as instruction commands to change the speed and direction of a paper motor in a printing device. The invention, however, is not so limited. In various embodiments, the set of computer executable instructions are operable to grant and/or regulate access to the register based serial interface 306. And, in various embodiments, the set of computer executable instructions are operable to provide measurement instructions (e.g. from the instruction stacks), measurement data (e.g. from the A/D converter), instruction commands from the one or more processor, among other information, between the instruction stacks and/or instruction queue on the first ASIC 302 and A/D converter on the second ASIC. That is, one or more sets of computer executable instructions can grant and/or regulate access to the register based serial interface 306.

In this manner, the one or more sets of computer executable instructions provide measurement instructions from the at least two firmware programmable instruction stacks, e.g. 308 and 310, to the second ASIC 304 using the register based serial interface 306. And, in various embodiments, the one or more sets of computer executable instructions are operable to provide received measurement data from the second ASIC 304 to one or more registers located in and/or associated with, e.g. 321, the at least two firmware programmable instruction stacks.

In various embodiments, as will be discussed next in reference to the embodiment of FIG. 4, one or more additional instruction stacks can be substituted in place of the instruction queue 315 and additional care is taken by firmware and/or the design of the first integrated circuit 302 to preserve a results register therein when servo data, calculated by the one or more processors 322, is written to the one or more additional instruction stacks.

Figure 4:
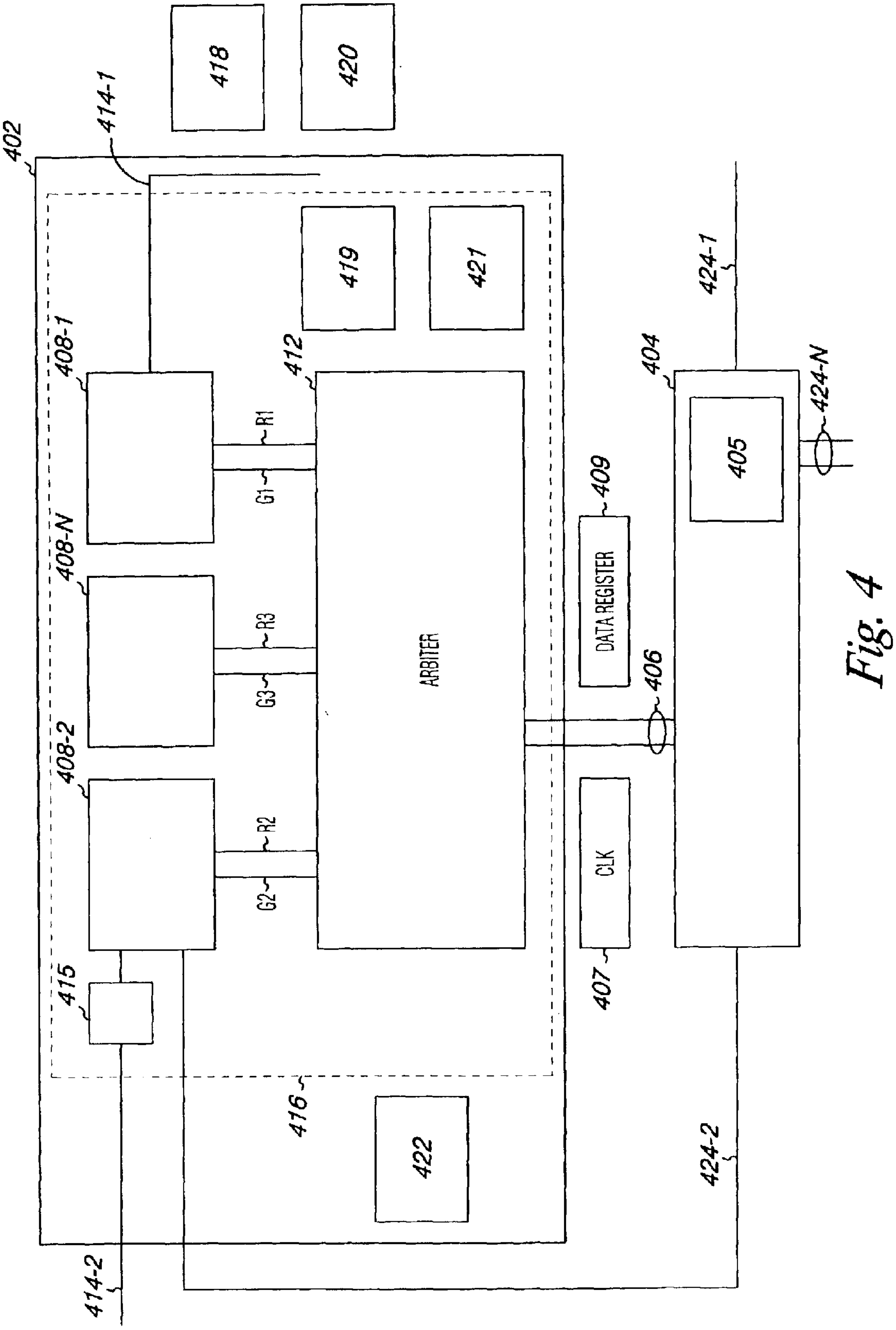
FIG. 4 illustrates another instruction architecture embodiment.

FIG. 4 illustrates another instruction architecture embodiment according to the teachings of the present invention. As shown in the embodiment of FIG. 4, a first integrated circuit (first IC) 402 is interfaced with a second integrated circuit (second IC) 404 via a serial interface 406. As with the embodiment in FIG. 3, the first integrated circuit 402 can be an application specific integrated circuit (first ASIC) and the second integrated circuit 404 can be a second application specific integrated circuit (second ASIC). In various embodiments, the first integrated circuit 402 includes an all digital integrated circuit or ASIC. As shown in the embodiment of FIG. 4, the second integrated circuit 404 includes an analog/digital (A/D) converter 405, as the same have been described herein.

The serial interface 406 includes a register based serial interface. In various embodiments, the serial interface 406 is operable to connect to multiple integrated circuits. And, as with the embodiment in FIG. 3, the serial interface can include a high speed serial interface operable at frequencies of twelve (12) MegaHertz or greater. In the embodiment of FIG. 4, a clock 407 is illustrated associated with the serial interface 406 for clocking the transfer of data across the serial interface 406. And, in the embodiment of FIG. 4, one or more data registers 409 can also be associated with the serial interface 406.

In the embodiment of FIG. 4, the first integrated circuit 402 includes at least three instruction stacks, shown as 408-1, 408-2, . . . , 408-N. However, the number of instruction stacks is not so limited. In the embodiment of FIG. 4, the at least three instruction stacks, 408-1, 408-2, . . . , 408-N, include firmware programmable instruction stacks. That is, the at least three instruction stacks, 408-1, 408-2, . . . , 408-N, include command areas which can be programmed by firmware 420, operably coupled to the first integrated circuit 402, to include a number of commands and/or routines. In various embodiments, the command areas of the at least three instruction stacks, 408-1, 408-2, . . . , 408-N, each include space to hold at least eight (8) commands.

One or more of the at least three instruction stacks, 408-1, 408-2, . . . , 408-N, can be configured to run off of timers or interrupt lines, illustrated in FIG. 4 as 414-1 and 414-2. Thus, one or more of the at least three instruction stacks, 408-1, 408-2, . . . , 408-N, are configured to be triggerable by one or more trigger sources. In various embodiments, by way of example and not by way of limitation, the one or more trigger sources trigger sources include a paper timer, a paper encoder interrupt, a paper fire interrupt, and signals derived from one or more carriage encoder pulses, among others.

The embodiment of FIG. 4 further illustrates an arbiter 412 coupled to the at least three instruction stacks, 408-1, 408-2, . . . , 408-N. As shown in the embodiment of FIG. 4, the at least three instruction stacks, 408-1, 408-2, . . . , 408-N, are coupled to the arbiter 412 via a number of grant and request lines, e.g. G1, R1; G2, R2; G3, R3. One of ordinary skill in the art will appreciate the manner in which grant and request lines can be used to interface the at least three instruction stacks, 408-1, 408-2, . . . , 408-N, with the arbiter 412.

The arbiter 412 is operable to provide a first priority to a first one, e.g. 408-1, of the at least three instruction stacks, 408-1, 408-2, . . . , 408-N. The arbiter 412 is operable to provide a second priority between the other ones of the at least three instruction stacks, e.g. 408-2, . . . , 408-N. In various embodiments, by way of example and not by way of limitation, providing a second priority between the other ones of the at least three instruction stacks, e.g. 408-2, . . . , 408-N can involve alternating access to the serial interface 406 between the other ones of the at least three instruction stacks, e.g. 408-2, . . . , 408-N.

In various embodiments, one or more of the at least three instruction stacks, 408-1, 408-2, . . . , 408-N, includes one or more functions selected from the group of a loop function, a delay function, a read register function, a write register function, and a read register and write to memory function (such as memory 418 operably couple to the first integrated circuit 402).

In the embodiment of FIG. 4, the at least three instruction stacks, 408-1, 408-2, . . . , 408-N, and the arbiter 412 with their respective grant and request lines, e.g. G1, R1; G2, R2; G3, R3, can be included as a part of a first hardware set 416 on the first integrated circuit 402. The first hardware set 416 can include one or more registers 419, as well as other hardware component/functions 421. By way of illustration and not by way of limitation, the other hardware component/functions can include an image pipeline and/or circuit blocks which control the firing of ink nozzles.

As shown in the embodiment of FIG. 4, the first integrated circuit includes one or more processors 422 operable on various sets of computer executable instructions suited for implementing various embodiments of the invention. The one or more processors 422 on the first integrated circuit 402 are operably coupled to memory 418 and firmware 420 located off of the first integrated circuit 402. As stated above, memory 418 can include any number of various memory types such as dynamic random access memory (DRAM), double data rate synchronous DRAM (DDRAM), among others of the like. Likewise, firmware 420 can include ROM, PROM, EPROM, and EEPROM, among others of the like.

As shown in the embodiment of FIG. 4, the second integrated circuit 404, having an A/D converter 405, includes a number of connection lines, 424-1, 424-2, . . . , 424-N, which are operable to transmit data, information, and instructions between the second integrated circuit 404 and other electronic circuitry. One of ordinary skill in the art will appreciate the various types of other electronic circuitry to which the second integrated circuit can be operably coupled. In various embodiments, by way of example and not by way of limitation, the number of connection lines can include control and sense lines and can include at least one connection pair, e.g. 424-1, which is operable to control and sense a paper encoder (not shown). Likewise, as shown in the embodiment of FIG. 4, the number of control and sense lines can include at least one connection, e.g. 424-2, which is operable to serve as an interrupt line, as the same have been described above, to at least one of the at least three instruction stacks, 408-1, 408-2, . . . , 408-N. By way of example and not by way of limitation, the at least one connection, e.g. 424-2 can serve as a paper encoder interrupt line. The invention, however, is not so limited.

In various embodiments of the present invention, the instruction architecture 400 described above includes a printer instruction architecture. However, the scope of the various embodiments is intended to include any operating environment having at least two firmware programmable instruction stacks on a first ASIC, a second ASIC coupled to the first ASIC by a serial interface, and means for arbitrating instructions between the first ASIC and the second ASIC so that multiple firmware programmable instruction stacks can access the second ASIC using the serial interface in a time sensitive manner.

At least one, or a first one (e.g. 408-1), of the at least three instruction stacks, 408-1, 408-2, . . . , 408-N, is operable to gather data for motor servo control calculations. In various embodiments, the first one 408-1 of the at least three instruction stacks, 408-1, 408-2, . . . , 408-N, is used as the paper motor servo instruction stack for a printing device. The paper motor servo instruction stack 408-1 is triggerable by a timer, such as a paper timer, over interrupt line 414-1. In this embodiment, by way of example and not by way of limitation, the paper motor servo instruction stack 408-1 is dedicated a first priority to access the serial interface 406 by the arbiter 412 due to the time sensitive nature of paper motor servo instruction routines associated with a printing device.

In various embodiments, a second one, e.g. 408-2, of the at least three instruction stacks, 408-1, 408-2, . . . , 408-N, is operable to receive commands for ink placement measurement routines associated with a printing device. As used herein, ink placement measurement routines are sometimes referred to as SPOT measurement routines and the second instruction stack 408-2 is then sometimes referred to as a SPOT instruction stack. The invention, however, is not so limited. And, in various embodiments, the second one 408-2 of the at least three instruction stacks, 408-1, 408-2, . . . , 408-N, is operable to receive commands for other measurement routines. By way of example and not by way of limitation way, other example measurement routines include measurement routines selected from the group of paper type (e.g. media sensor) measurement routines, ink cartridge temperature measurement routines, and ink level fluid measurement routines (e.g. for measuring the fluid level in ink cartridge reservoirs), among others of the like. The SPOT instruction stack is triggerable by one or more timers and/or interrupt signals. In various embodiments, the SPOT instruction stack can be triggered by a paper encoder interrupt signal receivable over interrupt line 424-1 from the second integrated circuit 404. In various embodiments, the SPOT instruction stack can be triggered by one or more signals from a digital sensor 415 derivable from a carriage encoder pulse.

In various embodiments, the second one 408-2 of the at least three instruction stacks, 408-1, 408-2, . . . , 408-N, is provided a second priority to access the serial interface 406 by the arbiter 412 to accommodate the time sensitive nature of these measurement routines.

As shown in the embodiment of FIG. 4, a third one, e.g. 408-N of the at least three instruction stacks, 408-1, 408-2, . . . , 408-N, is operable to receive functions and/or command instructions. By way of example and not by way of limitation, the third one, e.g. 408-N of the at least three instruction stacks, 408-1, 408-2, . . . , 408-N, is operable to receive motor speed and direction instruction commands, for all servo routines associated with a printing device, from the one or more processors 422 located on the first integrated circuit 402. As noted above, the motor speed and direction instruction commands can include phase data and pulse width modulation (PWM) data which are intended to be written to the second integrated circuit 404 to make motor adjustments. In various embodiments, the third one, e.g. 408-N of the at least three instruction stacks, 408-1, 408-2, . . . , 408-N, is provided a second priority to access the serial interface 406 by the arbiter 412. In various embodiments, the third one, e.g. 408-N of the at least three instruction stacks, 408-1, 408-2, . . . , 408-N, shares a second priority, to access the serial interface 406 among other ones of the at least three instruction stacks, e.g. with instruction stack 408-2.

In various embodiments, by way of example and not by way of limitation, the PWM and phase data can be less than 16 bits and can therefore fit into one serial interface transaction. In the embodiment of FIG. 4, additional care is taken by firmware and/or the design of the first integrated circuit 402 to preserve a results register, associated with other routines that may have been using the third instruction stack 408-N, when servo data calculated by the one or more processors 422 is written thereto.

The instruction architecture shown in FIG. 4, can be used as a printing device instruction architecture. In these embodiments, the at least three instruction stacks, 408-1, 408-2, . . . , 408-N are provided on a first ASIC 402. In various embodiments, one of the at least three instruction stacks, 408-1, 408-2, . . . , 408-N, can be dedicated to a paper servo routine, e.g. 408-1 and another of the at least three instruction stacks, 408-1, 408-2, . . . , 408-N, can be dedicated to a SPOT routine, e.g. 408-2. In various embodiments, the at least three instruction stacks, 408-1, 408-2, . . . , 408-N, can operate at a frequency of 12 MegaHertz (MHz) or greater.

By way of example and not by way of limitation, three methods of accessing a serial interface 406 are provided which accommodate time sensitive command and measurement instruction routines. Paper motor control and SPOT measurement routines are time sensitive command and measurement instruction routines. In various embodiments, a SPOT instruction stack, e.g. 408-2, can be triggered off of the paper encoder interrupt, e.g. 424-2, from an ASIC 404. Additionally, a SPOT instruction stack, e.g. 408-2, can be triggered by one or more signals from a digital sensor 415 which is derived from the carriage encoder pulses over interrupt line 414-2. A paper instruction stack, e.g. 408-1, can be triggered off of a paper timer over interrupt line 414-1. The three sources of serial interface 406 transactions are managed by a fixed priority arbiter 412 using grant and request lines, e.g. G1, R1; G2, R2; G3, R3.

In various embodiments a paper servo needs to be able to read 1) an A/D (analog/digital) value—8 bits
2) PENC (paper encode) values—2 bits
3) Digital position data—10–12 bits
4) High and low crossing point values for the current quadrature state—16 bits Each read can be from a unique register location in an analog ASIC, e.g. second integrated circuit 404. In some embodiments the A/D and PENC values can be combined in a single register. Thus, to read the above four (4) values at least three (3) serial interface 406 reads are used. As used herein, a serial interface read is interpreted as having 16 bits of data. The invention, however, is not so limited. The four values are to be synchronized to produce meaningful results. Therefore, an analog ASIC, such as ASIC 404, is configured and provided with a method to hold off updating any of the appropriate registers until all three serial interface 406 reads are complete. Various embodiments thus address latency issues regarding when data is needed and when the data is received in consideration of the time sensitivity of the data. Absent the various embodiments of the present invention there can be inappropriate delay with processes being locked out and a greater chance of having an error, such as a position error. By way of the various embodiments, multiple transactions can be configured to occur automatically over a single serial interface 406 without any additional delay.

In various embodiments, multiple dedicated instruction stacks can be used to perform consecutive serial interface 406 reads when a timer goes off, such as a paper timer in the printing device environment. An instruction stack will interrupt a CPU, e.g. 422, when the data is ready. By way of example and not by way of limitation, after reading the data and processing it, a paper servo routine can write phase and PWM values to an analog ASIC in order to make motor adjustments. The PWM and phase data is approximately 16 bits or less and therefore can fit into one serial interface 406 transaction. In various embodiments an instruction queue is provided which is deep enough to hold the PWM and phase data. In various embodiments, an instruction stack is provided to hold the PWM and phase data.

FIGS. 5–9 are block diagrams illustrating various method embodiments of the invention. The methods can be performed by software, application modules, and/or other computer executable instructions operable on the systems and devices shown herein or otherwise. Such software, application modules, and/or computer executable instructions can be resident in one location or in several and even many locations, such as in a distributed computing environment, throughout a system as described above. The invention, however, is not limited to any particular operating environment or to any particular type of computer readable instructions. Unless explicitly stated, the methods described below are not constrained to a particular order or sequence. Additionally, some of the so described methods can occur or be performed at the same point in time.

Figure 5:
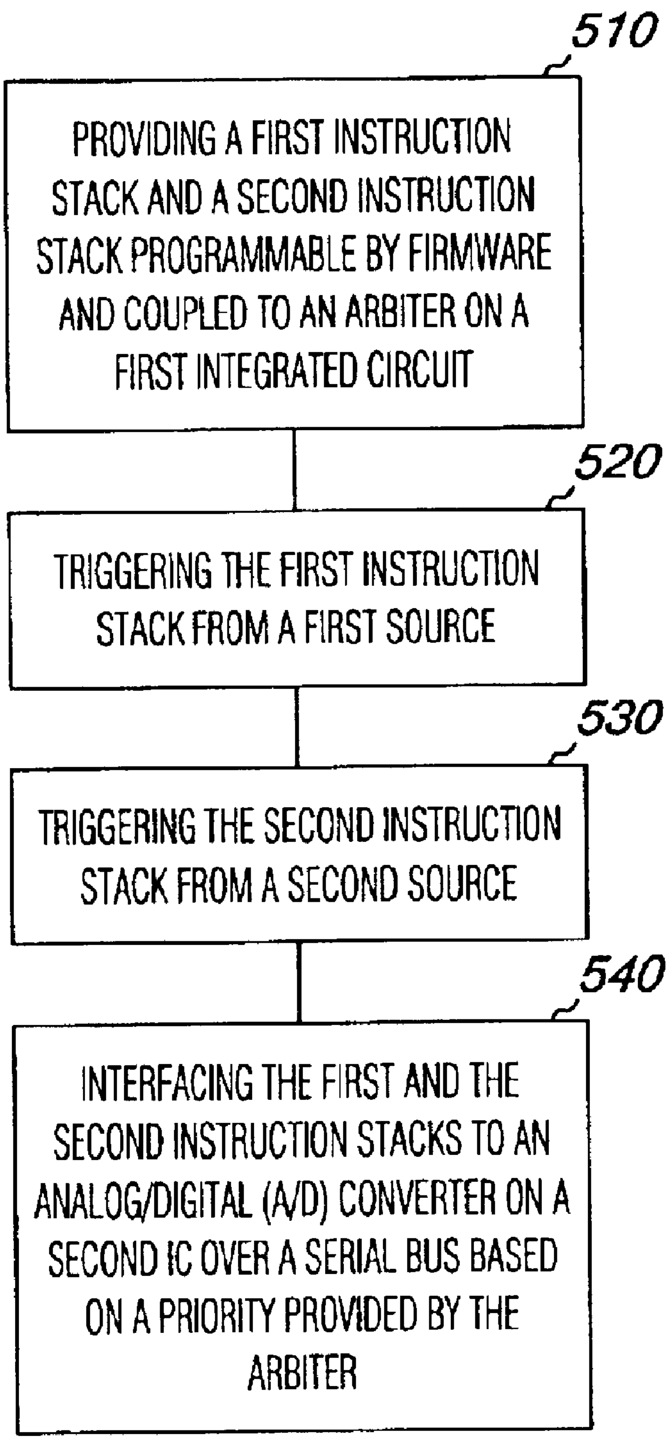
FIG. 5 illustrates a method embodiment for managing instructions using two instruction stacks.

FIG. 5 illustrates a method embodiment for managing instructions using two instruction stacks. As illustrated in the embodiment of FIG. 5, the method includes providing a first instruction stack and a second instruction stack programmable by firmware and coupled to an arbiter on a first integrated circuit (IC) at block 510. At block 520, the method embodiment of FIG. 5 includes triggering the first instruction stack from a first source. At block 530, the method includes triggering the second instruction stack from a second source. At block 540, the method further includes interfacing the first and the second instruction stacks to an analog/digital (A/D) converter on a second IC over a serial bus based on a priority provided by the arbiter.

Figure 6:
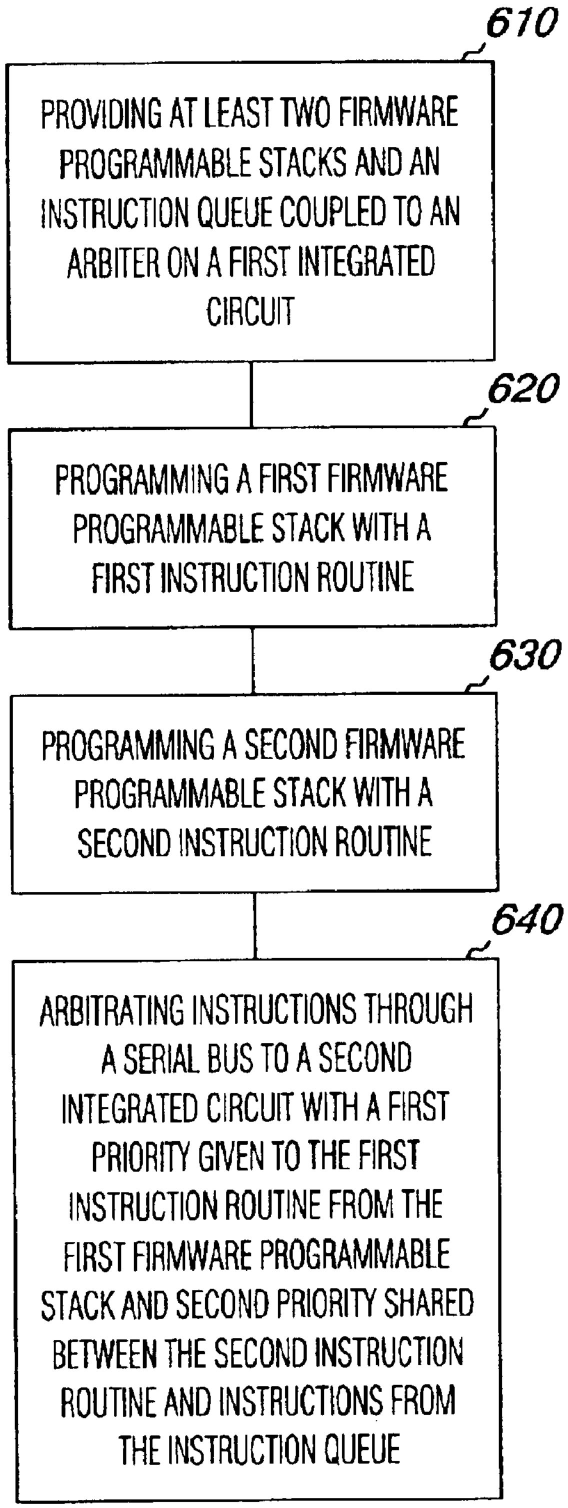
FIG. 6 illustrates a method embodiment for managing a printer architecture.

FIG. 6 illustrates a method embodiment for managing instructions using two instruction stacks and an instruction queue. As illustrated in the embodiment of FIG. 6, the method includes providing at least two firmware programmable stacks and an instruction queue couple to an arbiter on a first integrated circuit, as shown in block 610. As illustrated in block 620, the method includes programming a first firmware programmable stack with a first instruction routine. As illustrated in block 630, the method further includes programming a second firmware programmable stack with a second instruction routine.

The method further includes arbitrating instructions through a serial bus to a second integrated circuit with a first priority given to the first instruction routine from the first firmware programmable stack and a second priority shared between the second instruction routine and instructions from the instruction queue, as illustrated in block 640.

Figure 7:
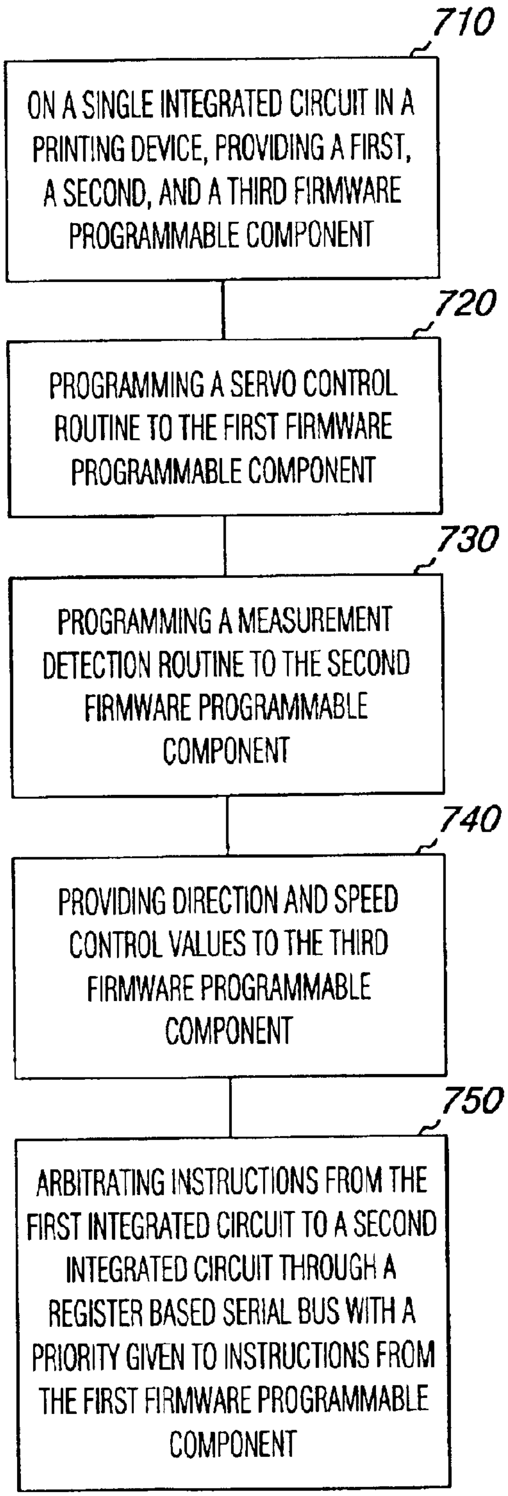
FIG. 7 illustrates a method embodiment for managing a printer architecture.

FIG. 7 illustrates a method embodiment for managing a printer architecture. As illustrated in the embodiment of FIG. 7, the method includes, on a single integrated circuit in a printing device, providing a first, a second and a third firmware programmable component, as illustrated in block 710. As illustrated in block 720, the method includes programming a servo control routine to the first firmware programmable component. As illustrated in block 730, the method includes programming a measurement detection routine to the second firmware programmable component. As illustrated in block 740, the method includes providing directional and speed control values to the third firmware programmable component. The method further includes arbitrating instructions from the first integrated circuit to a second integrated circuit through a register based serial bus with a priority given to instructions from the first firmware programmable component, as illustrated in block 750.

Figure 8:
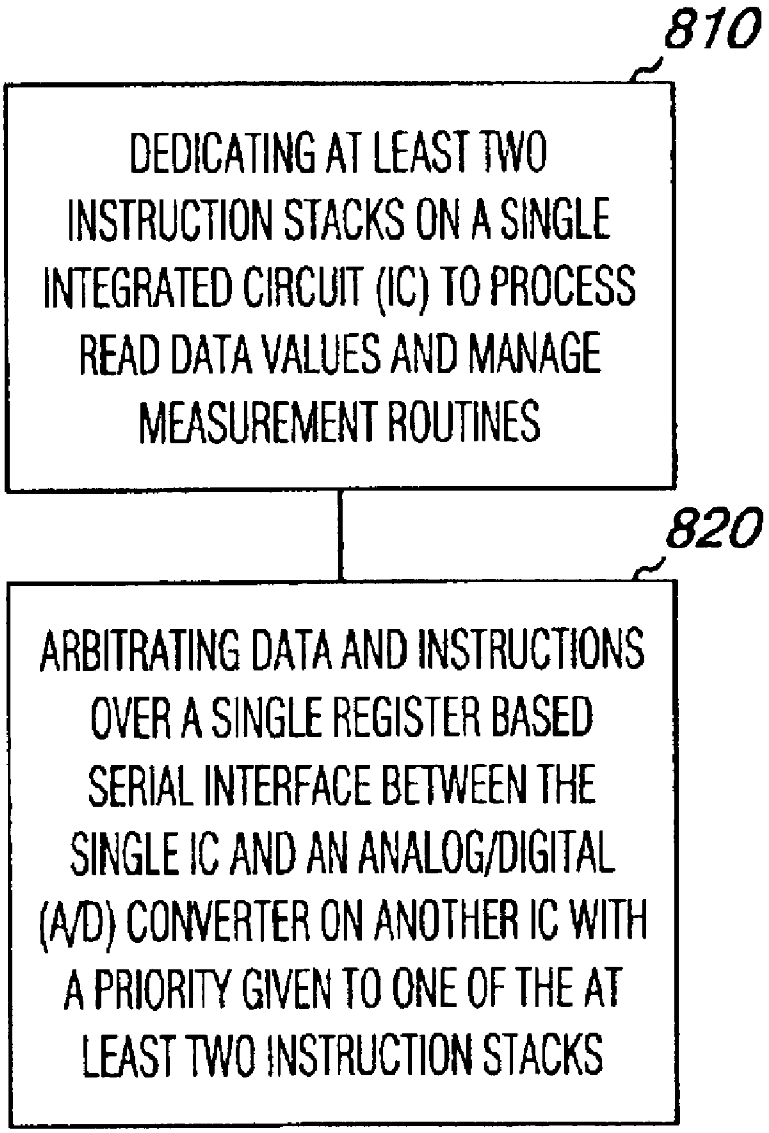
FIG. 8 illustrates a method embodiment for interfacing with a controller.

FIG. 8 illustrates a method embodiment for managing instructions over a serial interface. As shown in the embodiment of FIG. 8, the method includes dedicating at least two instruction stacks on a single integrated circuit (IC) to read data values and manage measurement routines, as illustrated in block 810. As illustrated in block 820, the method includes arbitrating data and instructions over a single register based serial interface between the single IC and an analog/digital (A/D) converter on another IC with a priority given to one or the at least two instruction stacks.

Figure 9:
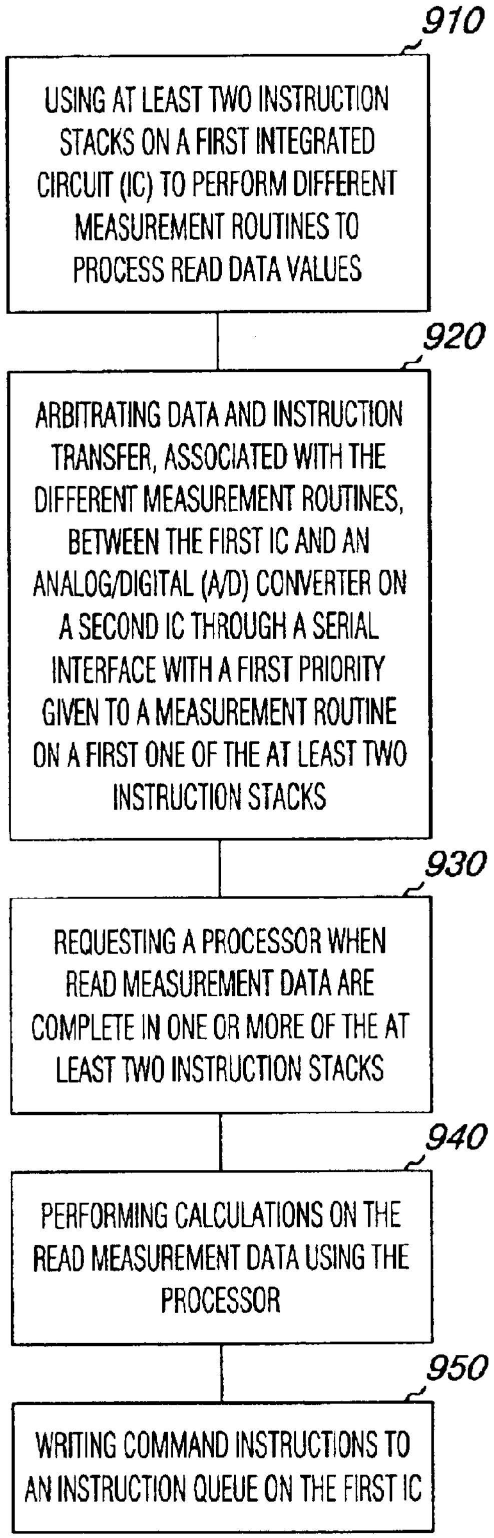
FIG. 9 illustrates a method embodiment for interfacing with a controller.

FIG. 9 illustrates a method embodiment for managing instructions over a serial interface. As shown in the embodiment of FIG. 9, the method includes using at least two instruction stacks on a first integrated circuit (IC) to perform different measurement routines to process read data values, as illustrated in block 910. As illustrated in block 920, the method includes arbitrating data and instruction transfer, associated with the different measurement routines, between the first IC and an analog/digital (A/D) converter on a second IC through a serial interface with a first priority given to a measurement routine on a first one of the at least two instruction stacks. As illustrated in block 930, the method includes requesting a processor when read measurement data are complete in one or more of the at least two instruction stacks. As illustrated in block 940, the method includes performing calculations on the read measurement data using the processor. The method further includes writing command instructions to an instruction queue on the first IC, as illustrated in block 950.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. § 1.72(b) requiring an Abstract that will allow the reader to quickly ascertain the nature of the technical disclosure. It is submitted with the understanding that it will not be used to limit the scope of the claims.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An instruction architecture, comprising:

a first integrated circuit, the integrated circuit having:

at least two instruction stacks; and an arbiter coupled to the at least two instruction stacks, wherein the arbiter request a processor when read measurement data are complete in at least one of the at least two instructions stacks;

a second integrated circuit; and a serial interface coupling the first and the second integrated circuits.

2. The architecture of claim 1, wherein the at least two instruction stacks include at least two instruction stacks programmable by firmware to include a number of commands.

3. The architecture of claim 1, wherein the at least two instruction stacks are configured to be triggerable by one or more trigger sources.

4. The architecture of claim 1, wherein the at least two instruction stacks include one or more functions selected from the group of a loop function, a delay function, a read register function, a write register function, and a read register and write to memory function.

5. The architecture of claim 1, wherein the first integrated circuit further includes an instruction queue coupled to the arbiter.

6. The architecture of claim 5, wherein the arbiter is operable to provide a first priority to a first one of the at least two instruction stacks, and wherein the arbiter is operable to provide a second priority between the instruction queue and a second one of the at least two instruction stacks.

7. A printer architecture, comprising:

a first application specific integrated circuit (ASIC), the first ASIC having;

a plurality of instruction stacks; and an arbiter coupled to the instruction stacks via grant and request lines, wherein the arbiter request a processor when read measurement data are complete in at least one of the plurality of instructions stacks;

a second ASIC; and a register based interface coupling the first and the second ASICs.

8. The printer architecture of claim 7, wherein the register based interface is operable to connect to multiple integrated circuits.

9. The printing architecture of claim 7, wherein the first ASIC has at least three instruction stacks.

10. The printer architecture of claim 7, wherein first ASIC also has a first in first out (FIFO) queue coupled to the arbiter.

11. The printer architecture of claim 10, wherein a first one of the instruction stacks is operable to gather data for motor servo calculations and is dedicated a first priority by the arbiter.

12. The printer architecture of claim 11, wherein a second one of the instruction stacks is operable to receive commands for measurement detection.

13. The printer architecture of claim 12, wherein the FIFO queue is operable to receive motor speed and direction data.

14. A printing device, comprising:

at least two firmware programmable instruction stacks and an instruction queue on an a first application specific integrated circuit (ASIC);

an analog/digital (A/D) converter on a second ASIC;

a register based serial interface coupling the first and the second ASICS; and means for arbitrating instructions between the first ASIC and the second ASIC using the register based serial interface so that multiple firmware programmable instruction stacks can access the second ASIC, the means including executable instructions to request a processor when read measurement data are complete in one or more of the at least two firmware programmable instructions stacks.

15. The printingdevice of claim 14, wherein the printing device includes one or more trigger sources coupled to the at least two firmware programmable instruction stacks.

16. The printing device of claim 14, wherein the means for arbitrating instructions between the first ASIC and the second ASIC includes:

dedicated instruction routines on the at least two firmware programmable instruction stacks operable to read data values and manage measurement routines; and an arbiter configured to yield a first priority to a first one of the at least two firmware programmable instruction stacks and configured to share a second priority between the instruction queue and one or more additional firmware programmable instruction stacks.

17. The printing device of claim 16, the means for arbitrating instructions between the first ASIC and the second ASIC includes a set of computer executable instructions operable to:

provide instruction commands to the instruction queue representing calculations by the processor on the read measurement data;

access the register based serial interface; and provide instruction commands from the instruction queue to the second ASIC.

18. The printing device of claim 16, wherein the dedicated instruction routines on the at least two firmware programmable instruction stacks operable to read data values and manage measurement routines includes a set of computer executable instructions to:

access the register based serial interface;

provide measurement instructions from the at least two firmware programmable instruction stacks to the second ASIC using the register based serial interface;

provide received measurement data from the second ASIC to one or more registers in the at least two firmware programmable instruction stacks.

19. A printing system, comprising:

printing device, wherein the printing device includes:

at least two firmware programmable instruction stacks and an instruction queue on a first application specific integrated circuit (ASIC);

an analog/digital (A/D) converter on a second ASIC;

a register based serial interface coupling the first and the second ASICS; and an arbitration system that allows the at least two firmware programmable instruction stacks and the instruction queue to access the register based serial interface, and provides a priority to a first one of the at least two firmware programmable instruction stacks, wherein the arbitration system requests a processor when read measurement data are complete on one or more of the at least two firmware programmable instructions stacks; and a host device connected to the printing device and operable to transmit one or more print jobs to the printing device over one or more data links.

20. A method for managing instructions using two instruction stacks, comprising:

providing a first instruction stack and a second instruction stack programmable by firmware on a first integrated circuit (IC);

assigning a first priority to the first instruction stack;

assigning a second priority to the second instruction stack triggering the first instruction stack from a timer;

triggering the second instruction stack; and interfacing the first and the second instruction stacks to an analog/digital (A/D) converter on a second IC over a serial bus based on a priority provided by the arbiter.

21. The method of claim 20, wherein the method further includes providing an instruction queue on the first IC and assigning the second priority to the instruction queue such that the instruction queue shares the second priority with the second instruction stack.

22. The method of claim 20, wherein providing a first instruction stack and a second instruction stack programmable by firmware includes providing at least one instruction stack operable to read data values and manage measurement routines.

23. The method of claim 22, wherein providing a first instruction stack and a second instruction stack programmable by firmware includes providing at least one instruction stack operable to receive commands for measurement detection.

24. The method of claim 20, wherein providing a first instruction stack programmable by firmware includes programming the first instruction stack with a motor servo control routine.

25. The method of claim 20, wherein providing a second instruction stack programmable by firmware includes programming the second instruction stack with at least one measurement routine.

26. The method of claim 20, wherein providing a first instruction stack and a second instruction stack programmable by firmware includes providing at least one instruction stack operable to perform a loop function, a delay function, a read register function, a write register function, and a read register and write to memory function.

27. A method for managing a printer architecture, comprising:

providing at least two firmware programmable stacks coupled to an arbiter on an all digital application specific integrated circuit (ASIC);

triggering a first firmware programmable stack from a timer;

triggering a second firmware programmable stack from a second source; and interfacing the first and the second firmware programmable stacks through the arbiter to a second ASIC over a register based serial interface which allows connection of multiple integrated circuits (ICs) to the same interface.

28. The method of claim 27, wherein the method further includes providing a third firmware programmable stack coupled to the arbiter on the all digital ASIC.

29. The method of claim 28, wherein providing the third firmware programmable stack includes providing a third firmware programmable stack operable to receive command instructions.

30. The method of claim 27, wherein interfacing over a register based serial interface includes interfacing at a frequency of 12 MegaHertz or greater.

31. The method of claim 27, wherein triggering a second firmware programmable stack from a second source includes triggering the second firmware programmable stack from one or more signals derived from one or more carriage encoder pulses.

32. The method of claim 27, wherein triggering a second firmware programmable stack from a second source includes triggering the second firmware programmable stack from a paper encoder interrupt received from the second ASIC.

33. A method managing instructions over a serial interface, comprising:

dedicating at least two instruction stacks on a single integrated circuit (IC) to read data values and manage measurement routines;

arbitrating data and instructions over a single register based serial interface between the single IC and an analog/digital (MD) converter on another IC with a priority given to one of the of the at least two instruction stacks; and requesting a processor when read measurement data are complete in one or more of the at least two instruction stacks.

34. A computer readable medium having a set of computer executable instructions thereon for causing a device to perform a method, the method comprising:

using at least two instruction stacks on a first integrated circuit (IC) to perform different measurement routines;

arbitrating data and instruction transfer, associated with the different measurement routines, between the first IC and a second IC through a serial interface with a first priority given to a measurement routine on a first one of the at least two instruction stacks; and requesting a processor when read measurement data are complete in one or more of the at least two instruction stacks.

35. The method of claim 34, wherein the method further includes:

performing calculations on the read measurement data using the processor; and writing command instructions to an instruction queue on the first IC.

36. The method of claim 35, wherein the method further includes arbitrating command instruction transfer between the instruction queue on the first IC and the AID converter on the second IC through a serial interface with a second priority shared between the instruction queue and a measurement routine on a second one of the at least two instruction stacks.

* * * * *